(12) United States Patent
Boyle et al.

(10) Patent No.: US 12,166,795 B2
(45) Date of Patent: Dec. 10, 2024

(54) CYBER SECURITY SYSTEM AND METHOD

(71) Applicant: LiveRamp, Inc., San Francisco, CA (US)

(72) Inventors: Rachael Boyle, San Francisco, CA (US); Lucy Huang, Corpus Christi, TX (US); Lisa Cramer, Piedmont, CA (US)

(73) Assignee: LiveRamp, Inc., San Francisco, CA (US)

( * ) Notice: Subject to any disclaimer, the term of this patent is extended or adjusted under 35 U.S.C. 154(b) by 230 days.

(21) Appl. No.: 17/911,853

(22) PCT Filed: Mar. 8, 2021

(86) PCT No.: PCT/US2021/021327
§ 371 (c)(1),
(2) Date: Sep. 15, 2022

(87) PCT Pub. No.: WO2021/188315
PCT Pub. Date: Sep. 23, 2021

(65) Prior Publication Data
US 2023/0009704 A1     Jan. 12, 2023

Related U.S. Application Data

(60) Provisional application No. 62/991,672, filed on Mar. 19, 2020.

(51) Int. Cl.
*H04L 9/40* (2022.01)

(52) U.S. Cl.
CPC ...... *H04L 63/1483* (2013.01); *H04L 63/1425* (2013.01); *H04L 2463/146* (2013.01)

(58) Field of Classification Search
CPC ............ H04L 63/1483; H04L 63/1425; H04L 2463/146
See application file for complete search history.

(56) References Cited

U.S. PATENT DOCUMENTS 9,800,605 B2   10/2017   Baikalov et al.
10,505,965 B2  12/2019   Moyle et al.
(Continued)

FOREIGN PATENT DOCUMENTS

EP        3528462 A1   8/2019

OTHER PUBLICATIONS

Extended European Search Report for Application No. 21771097.9 (Mar. 13, 2024).
(Continued)

*Primary Examiner* — Kambiz Zand
*Assistant Examiner* — Afaq Ali

(57) ABSTRACT

A cyber security system creates a behavioral framework for evaluating the cyber security of an organization's computer systems based on its employees. The system leverages offline and online individual identity information and then translates this data to anonymous identifiers to protect privacy. The identifiers are used to pull data from an identity graph, which includes behavioral data. A business-to-business identity graph correlates the name of an organization that maintains the targeted computer system with the anonymous identifiers of employees. Online activity is gathered by pixels fired from websites accessed by user browsers and gathered by one or more remote servers.

20 Claims, 10 Drawing Sheets

(56) References Cited

U.S. PATENT DOCUMENTS

| | | | |
|---|---|---|---|
| 11,122,066 B2* | 9/2021 | Kyle | H04L 63/1425 |
| 2012/0072982 A1* | 3/2012 | Ranganathan | G06Q 30/06 |
| | | | 726/22 |
| 2012/0137367 A1 | 5/2012 | Dupont et al. | |
| 2013/0086254 A1* | 4/2013 | Bhola | H04L 63/1433 |
| | | | 709/224 |
| 2014/0222515 A1 | 8/2014 | Cordery | |
| 2015/0088612 A1* | 3/2015 | Palan | G06Q 30/0205 |
| | | | 705/7.29 |
| 2015/0244735 A1 | 8/2015 | Kumar et al. | |
| 2015/0373039 A1 | 12/2015 | Wang | |
| 2017/0118236 A1 | 4/2017 | Devi Reddy et al. | |
| 2017/0244746 A1 | 8/2017 | Hawthorn et al. | |
| 2018/0027006 A1 | 1/2018 | Zimmermann et al. | |
| 2018/0159889 A1 | 6/2018 | Sjouwerman | |
| 2018/0212931 A1* | 7/2018 | Zhou | G06Q 30/0609 |
| 2018/0359244 A1 | 12/2018 | Cockerill et al. | |
| 2018/0359275 A1* | 12/2018 | Ng | G06Q 40/06 |
| 2019/0260783 A1* | 8/2019 | Humphrey | H04L 67/12 |
| 2020/0053111 A1 | 2/2020 | Jakobsson | |
| 2020/0314134 A1* | 10/2020 | Izrael | G06F 21/552 |
| 2020/0410001 A1* | 12/2020 | Sarkissian | G06F 3/0482 |

OTHER PUBLICATIONS

Apparao, Vidur, "The Agari Identity Graph: A New Way to Combat Email Threats," retrieved from https://www.agari.com/email-security-blog/identity-intelligence-to-combat-email-threats/ (May 30, 2018).

Gordon, William J. et al., "Assessment of Employee Susceptibility to Phishing Attacks at US Health Care Institutions," JAMA Network Open. 2019;2(3) (Mar. 8, 2019).

Ragan, Steve et al., "Study Links Phishing Vulnerabilities to Personality Traits," retrieved from https://www.csoonline.com/article/2134031/study-links-phishing-vulnerabilities-to-personality-traits.html (2013).

Peterson, Patrick, "Inside the Identity Graph: How Predictive AI Beats BEC Scams," retrieved from https://www.agari.com/email-security-blog/inside-the-identity-graph/ (Dec. 17, 2018).

Carlton, Melissa et al., "Mitigating Cyber Attacks through the Measurement of Non-IT Professionals' Cybersecurity Skills," Information and Computer Security 27.1: 101-121 (Emerald Group Publishing Limited 2019).

* cited by examiner

CYBER SECURITY SYSTEM AND METHOD

CROSS-REFERENCE TO RELATED APPLICATIONS

This application claims the benefit of U.S. provisional patent application No. 62/991,672, entitled "Cyber Security System," filed on Mar. 19, 2020. Such application is incorporated herein by reference in its entirety.

BACKGROUND OF THE INVENTION

A "phishing" attack is a form of social engineering. Typically, the person engaging in the attack sends an email or other electronic message intended to fraudulently induce the person receiving the message to reveal private information, such as passwords or financial data. The sender of the message will often pose as a trustworthy person or entity, such as a senior executive at the target person's employer, or a financial institution. Often, the message may contain a link to a website that may appear quite similar to a legitimate site in order to trick the person receiving the message into entering private information at the site. In other cases, the link may lead to a website that automatically installs malware on the target individual's computing device. Phishing attacks do not initially require the attacker to actually break any security measures put in place by the receiver's computer system or network because the purpose of the attack is to deceive the person receiving the message into revealing private information voluntarily. If the information thus revealed includes passwords, the attacker may thereby access the receiver's computer system with the fraudulently obtained information. Once access is gained, the attacker may steal private information, install malware, or engage in a ransomware attack.

Attempts to combat phishing attacks at businesses generally involve technical solutions or employee education efforts. Technical solutions may include, for example, warning messages appearing in emails from external senders, the purpose of which is to highlight a message that may appear to be from an organizational employee such as a supervisor or IT personnel but in fact originated from another source. Email systems were not, however, designed with these sorts of attacks in mind, and thus there is no complete technical solution to the problem. Another approach is for the computer system administrator to launch its own phishing attacks, and flag any users of the system who are fooled by the attacks for additional training. Many organizations require all employees to undergo at least some level of training to identify phishing attacks and other cyber security risks, such as annual training requirements. Nevertheless, while employee education efforts may lessen the likelihood that any individual employee may be fooled by a phishing attack, the attacker only needs to fool a single person in order to gain the desired information, and thus the risk of a failure grows proportionally with the number of employees who have access to an organization's computer networks. It would be desirable to provide a technical system capable of identifying those employees who are most likely to be at risk to a phishing attack, and evaluate the risk to the organization as a whole so that a response can be prepared that is proportional to the threat faced by the organization.

References mentioned in this background section are not admitted to be prior art with respect to the present invention.

BRIEF SUMMARY OF THE INVENTION

In certain implementations, the present invention is directed to a system and method for providing a quantifiable measure of the risks any particular group of users of a computer system (such as employees at a large company or other organization) represents in case of a phishing attack directed at one more of the users. The system for implementing the invention utilizes one or more identity graphs. An identity graph is a large data structure that contains identifiers matched to entities, such as, for example, consumers and businesses. Identity graphs typically contain a great deal of additional information associated with the identifiers, such as personal information, demographic information, firmographic information, propensity or consumptive data, and the like.

In certain implementations, the system for implementing the invention may utilize an offline identity graph (i.e., an identity graph with offline personal and consumptive data such as in-store purchases); an online identity graph (i.e., an identity graph with online data such as online purchases, browsing history, and email addresses); and a business-to-business (B2B) identity graph (i.e., a graph with data used for business transactions between businesses rather than between businesses and end consumers). The method utilizes offline identity information (such as personally identifiable data or PII) as well as online identity information for the subject users, and then translates this data to anonymous identifiers to protect the privacy of these individuals. The anonymous identifiers do not contain PII and are generated in a manner that does not allow PII to be derived from the anonymous identifiers. The anonymous identifiers are generated through a translation process that translates PII to pseudonymous identifiers and connects the pseudonymous identifier to other online or anonymous signals about the individual, such as found in the online identity graph. This online identity graph can also tie anonymous identifiers to other behavioral data from a marketplace of data providers, including but not limited to psychographic, demographic and behavioral data.

In other implementations, a passive view is provided through a B2B identity graph. It passively and automatically translates the name of an organization that maintains the targeted computer system with the anonymous identifiers of employees or other users associated with that organization. The B2B identity graph contains nodes that each correspond to a business entity, and may contain a substantially comprehensive set of nodes for business entities within a particular segment in a particular geographic or juristic region. Online activity is gathered by pixels fired from websites accessed by user browsers and gathered by one or more remote servers. By combining online and offline activity and matching (by way of anonymous identifiers) to an individual, the system is able to create a behavioral framework for individual users of the computer system without compromising the privacy of such individuals and without revealing any personal information about the users to the computer system administrator. Using the behavioral traits identified, the implementation then computes a risk factor associated with individual users and for the computer system as a whole. In addition, by gathering such data for a number of organizational computer systems, the implementation may provide a comparative measure of the cyber risk a certain organization faces compared to the cyber risk faced by other organizations, including, for example, organizations in a similar field, organizations of a similar size, organizations in the same legal jurisdiction, or any other means by which companies may be segmented.

In certain implementations, the present invention allows the administrator of a computer network to understand the system's level of risk against a cyber security issue such as a phishing attack, insider threat or other related tactics. It may also allow the administrator to limit certain access or features accessible to certain users in order to reduce the risk of such an attack against the computer network. Likewise, the present invention allows the administrator, or other interested parties like cyber insurance providers or business partners, to gain a better overall sense of the risk of a successful phishing attack against the computer network in general by knowing the risk posed by the particular users of the system, rather than by computer users as a whole, thereby enabling appropriate safeguards to be implemented corresponding to the level of risk. The administrator may act on this knowledge by, for example, creating targeted training for high-risk users. The present invention can also serve as a data point in cyber risk assessments around phishing and cyber security culture. Assessing these attributes using prior art methods is very time-consuming as it relies on inefficient communication between the assessing company and the vendor being assessed. In addition, prior art methods also rely on subjective data points self-asserted by the target company through a questionnaire process. With the system relying on data assets like the B2B identity graph as well as the behavioral framework algorithm, impartial insights into these cyber risk metrics can be generated instantaneously and on a continuous basis for security administrators to receive reports and distinguish cyber threats. The various implementations of the system and method represent a marked improvement in turnaround from the current methods in the cyber risk industry, which can take anywhere from a month to a quarter to generate results by which time a breach might have already occurred before any action can be taken.

These and other features, objects and advantages of the present invention will become better understood from a consideration of the following detailed description of the preferred embodiments, in conjunction with the included drawing, and appended claims.

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
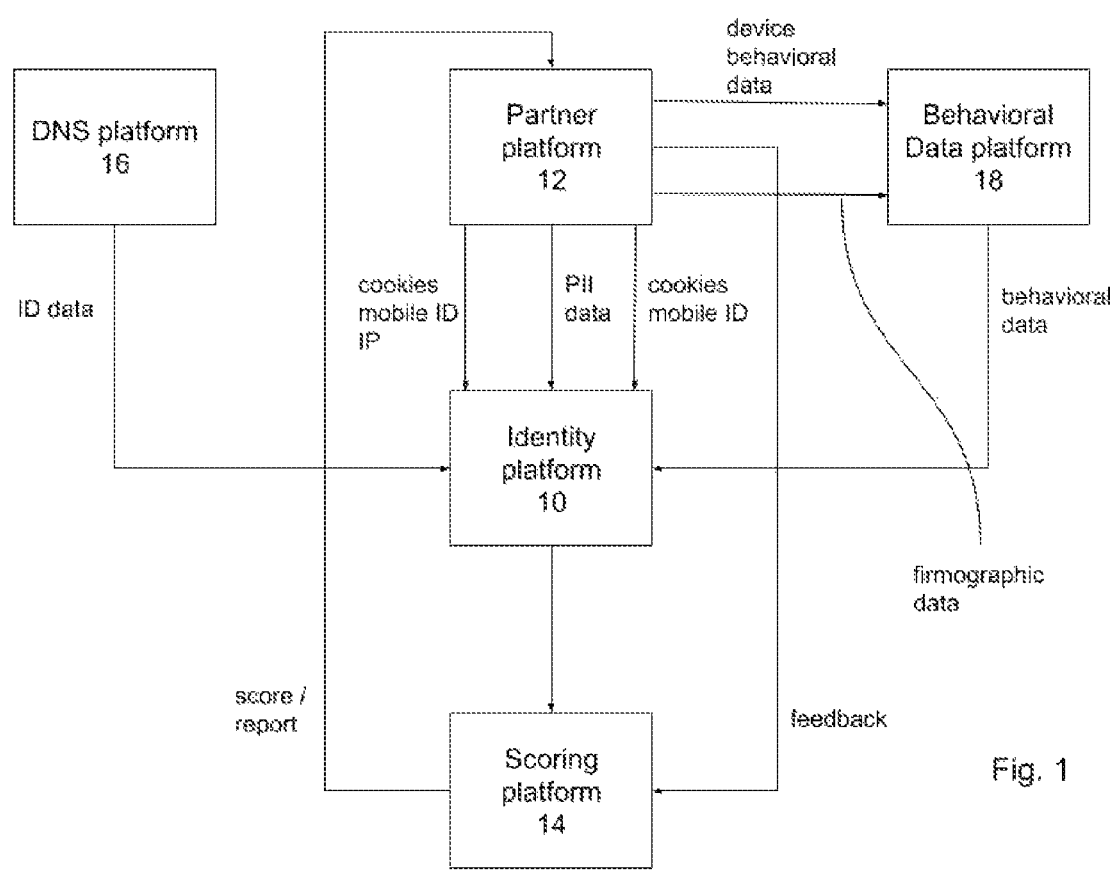
FIG. 1 is an overall system architecture diagram according to an implementation of the present invention.

Referring to FIG. 1, a system and method according to one implementation of the invention may be described. Identity platform 10 comprises hardware and software operable to match employee data files with various other data gathered concerning the employees that is relevant to cyber security risk. The information necessary for the identity services provider is gathered from the various components of partner platform 12, including the servers maintained by various companies utilizing the service and their employees, acting through their various electronic devices such as desktop computers and smartphones. In addition, information is provided across the Internet from domain name service (DNS) servers at DNS platform 16 about web browsing activities. Further, behavioral data platform 18 provides behavioral data to identity platform 10. The cyber security score platform 14 utilizes the anonymized information from identity platform 10 to generate the cyber security score. This score may be continually updated using future provisions of feedback data from partner platform 12 in response to previous scores calculated by scoring platform 14, which then may result in the production of updated scores by scoring platform 14.

Figure 2:
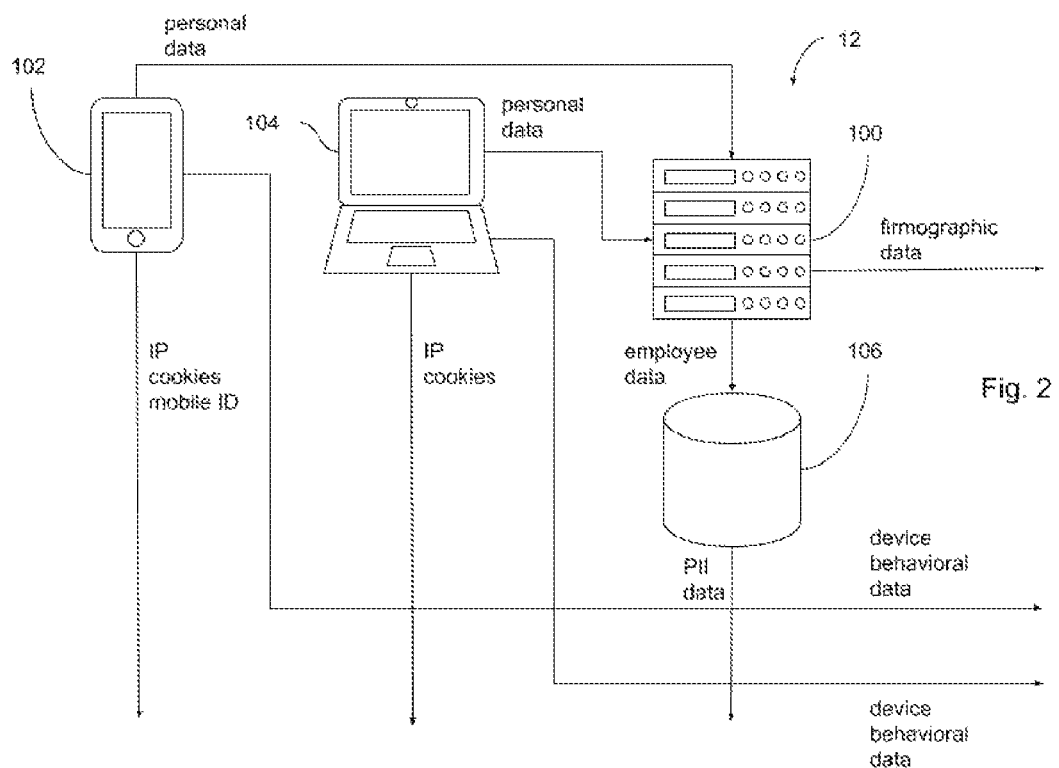
FIG. 2 is an architecture diagram for a partner platform according to an implementation of the present invention.

Referring now to FIG. 2, partner platform 12 may be described in greater detail. Although only one partner platform 12 is illustrated herein, it should be understood that the invention is usable with any number of partner platforms 12. In fact, the invention is envisioned for use with many partner platforms 12, each of which are able to separately utilize the cybersecurity risk scoring provided by the invention. Employees of these companies have various personally identifiable information (PII), such as a name, physical address, phone number, and email address. This information is known to the business, and is stored at partner PII database 106. At the same time, employees using various digital devices (either when engaged in the business of their employers or otherwise) are generating digital information through activities such as web browsing. This activity is associated with individual employees through such means as cookies set on the employees' browser, IP addresses associated with the employee, or mobile device identifiers (mobile IDs). Personal data may be received from employee-operated electronic devices such as smartphone 102 and personal computer 104. This information is provided through partner network 100, which is in electronic communication with partner PII database 106. In addition, IP/cookie information is provided from personal computers 104 to identity platform 10. Likewise, IP/cookie/mobile ID data is provided from smartphones 102 to identity platform 10. Device behavioral data from these sources is provided to behavioral data platform 18. Partner network 100 provides firmographic data to behavioral data platform 18. Firmographic data includes, for example, information about an organization's size, revenue, industry, and operational locations; it allows the companies to be divided into meaningful segments for various purposes.

Figure 3:
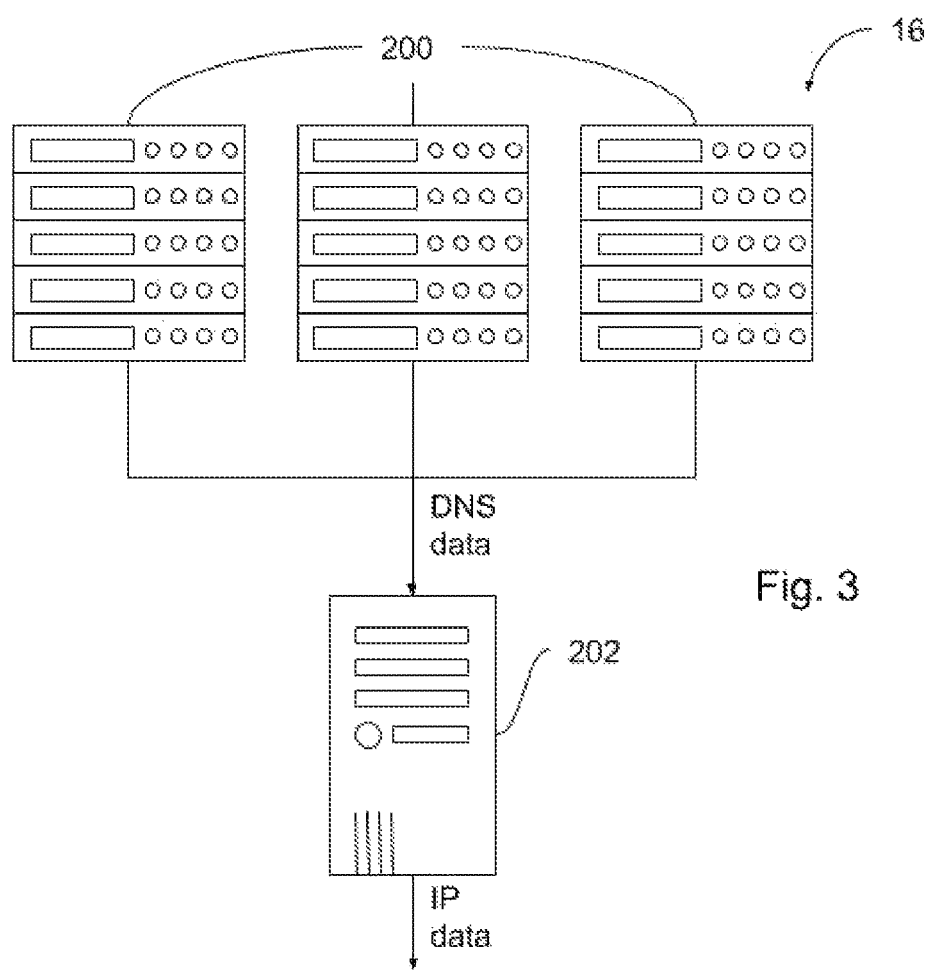
FIG. 3 is an architecture diagram for a DNS platform according to an implementation of the present invention.

As shown in FIG. 3, DNS servers 200 operating within the Internet framework process IP data, and provide data to the business IP data provider. DNS platform 16 provides the capability for converting human-readable domain names into Internet Protocol (IP) addresses used by computers for addressing activities on the Internet. Although three DNS servers 200 are shown, it will be understood that the Internet backbone includes many DNS servers. IP Data provider server 202 receives DNS data and outputs IP data, which is used by identity platform 10.

Figure 4:
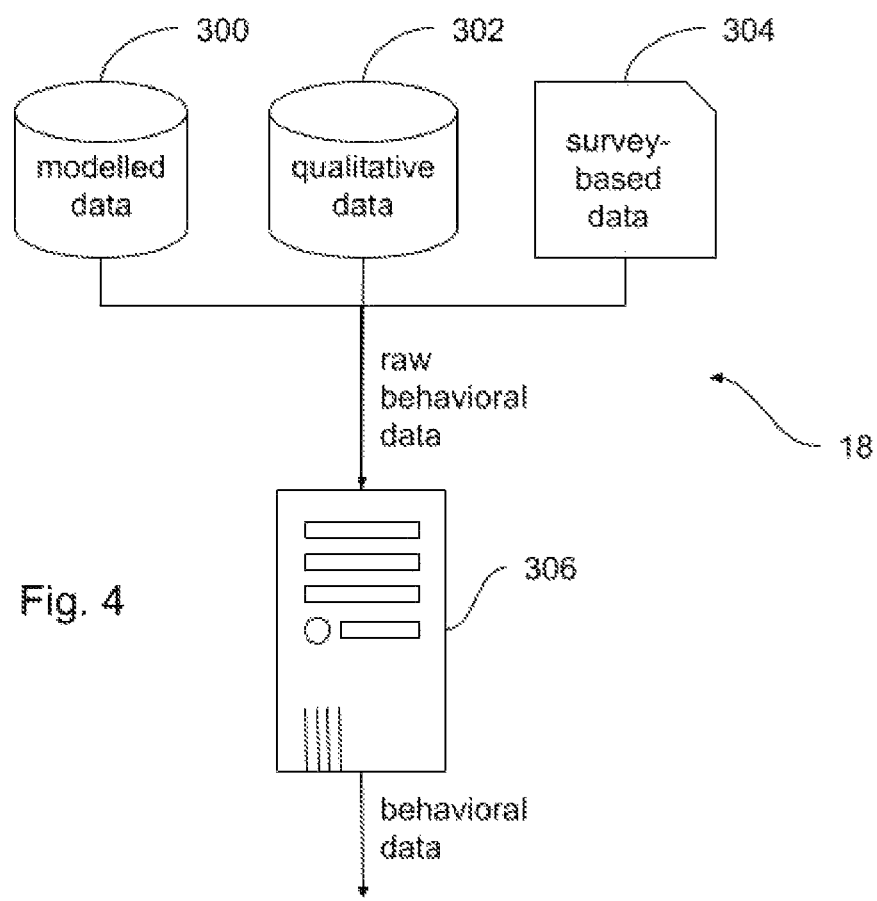
FIG. 4 is an architecture diagram for a behavioral data platform according to an implementation of the present invention.

FIG. 4 shows in more detail the computing components for behavioral data platform 18. There are multiple third-party sources of data fed to the behavioral data provider server 306. These include modelled data (i.e., data that is inferred from known data based on behavioral models) from modelled data database 300; qualitative data from qualitative data database 302; and survey-based data (included data gathered not only from user surveys but other sources such as, but not limited to, warranty registrations) from survey-based data database 304. This raw behavioral data is sent to behavioral data provider server 306 for processing. Behavioral data processing server 306 then outputs behavioral data to identity platform 10.

In addition, behavioral data provider server 306 may maintain a database of data pertaining to employees of one or more firms, and associated with each of such employees may be an identifier or "link" that is unique to such employee across the universe of all possible employees. This link is used to uniquely identify an employee, even though there may be ambiguity with respect to name, address, or other such identifying information. This link may be generated in such a way that it is anonymous, i.e., that no PII is disclosed by associated non-PII data with the link itself. Behavioral data provider server 306 may provide these anonymous links with the behavioral data it sends to identity platform 10 in order to help identify the corresponding employee for purposes of matching.

Figure 5:
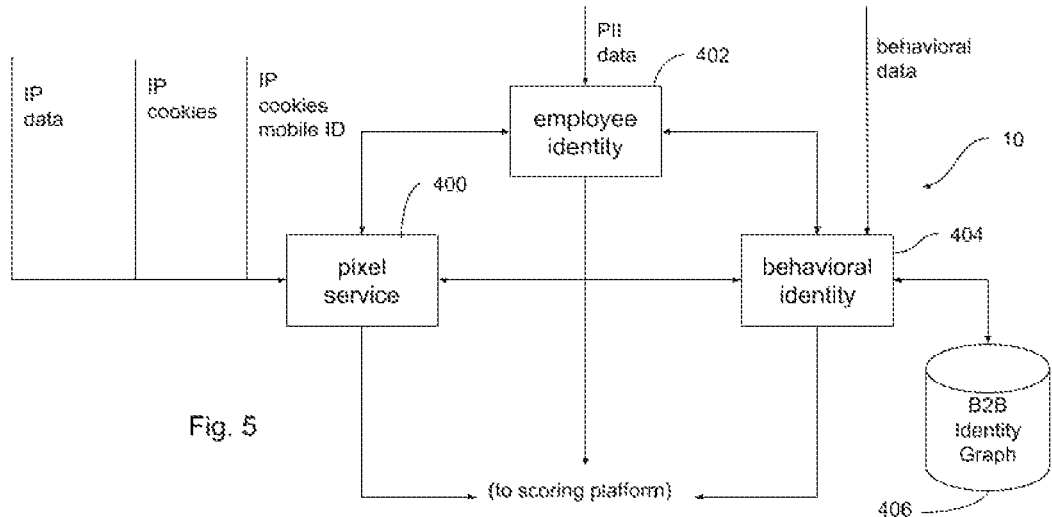
FIG. 5 is an architectural diagram for an identity platform according to an implementation of the present invention.

Turning now to FIG. 5, the hardware/software computing components of identity platform 10 may be described. These components include an employee identity compute cluster 402, a behavioral identity compute cluster 404, and a pixel service cluster 400. Each of these clusters may, for example, consist of multiple computing platforms with multiple linked databases incorporated therein. The employee identity compute cluster 402 receives PII data from partner platform 12 and uses this data for purposes of identity resolution for employees. The behavioral identity compute cluster 404 receives behavioral data from behavioral data platform 18 and uses this data for purposes of associating the behavioral characteristics of employees to the resolved identity of those employees provided by the employee identity compute cluster 402. The pixel service compute cluster 400 receives digital data from the partner platform 12, including device data from employees, as well as information indicative of web browsing by employees. This may include, for example, data gathered from tracking web beacons/pixels in web pages visited by employees and information gathered from cookies that were set on the browsers of the employees. By communications between the employee identity compute cluster 402, the behavioral identity compute cluster 404, and the pixel service compute cluster 400, all of the corresponding data is matched with employees. Once the PII is used for identification and matching purposes, the employee identity compute cluster 402 strips out all PII and assigns an anonymous identifier to each record of data corresponding to an employee, in order to protect the privacy of the employee. No PII is sent outside of the identity platform 10, and thus there is no risk of a loss of privacy due to data being intercepted in transit across a communications network.

Identity platform 10 may further include a business-to-business (B2B) identity graph 406 in communication with, for example, the behavioral identity compute cluster 404. The B2B identity graph 406 may include a plurality of logical nodes wherein each of the nodes corresponds to a business entity, and a node exists for substantially all business entities of a segment within a particular region. By utilizing the B2B identity graph 406, the behavioral identity compute cluster 404 is configured to perform identity resolution for the plurality of businesses by comparing data received at the identity platform 10's inter-communicating components against the B2B identity graph 406.

Figure 6:
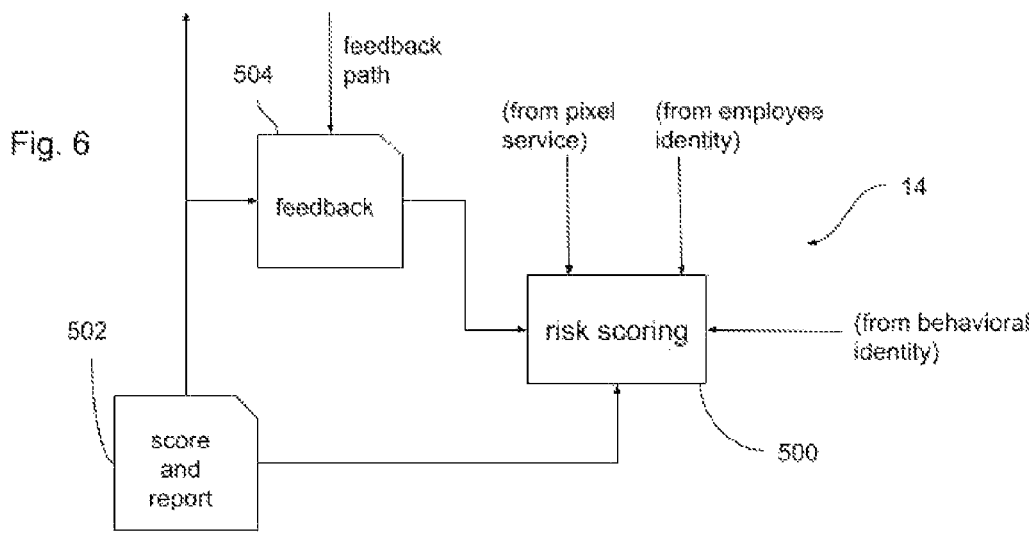
FIG. 6 is an architectural diagram for a scoring platform according to an implementation of the present invention.
Figure 7:
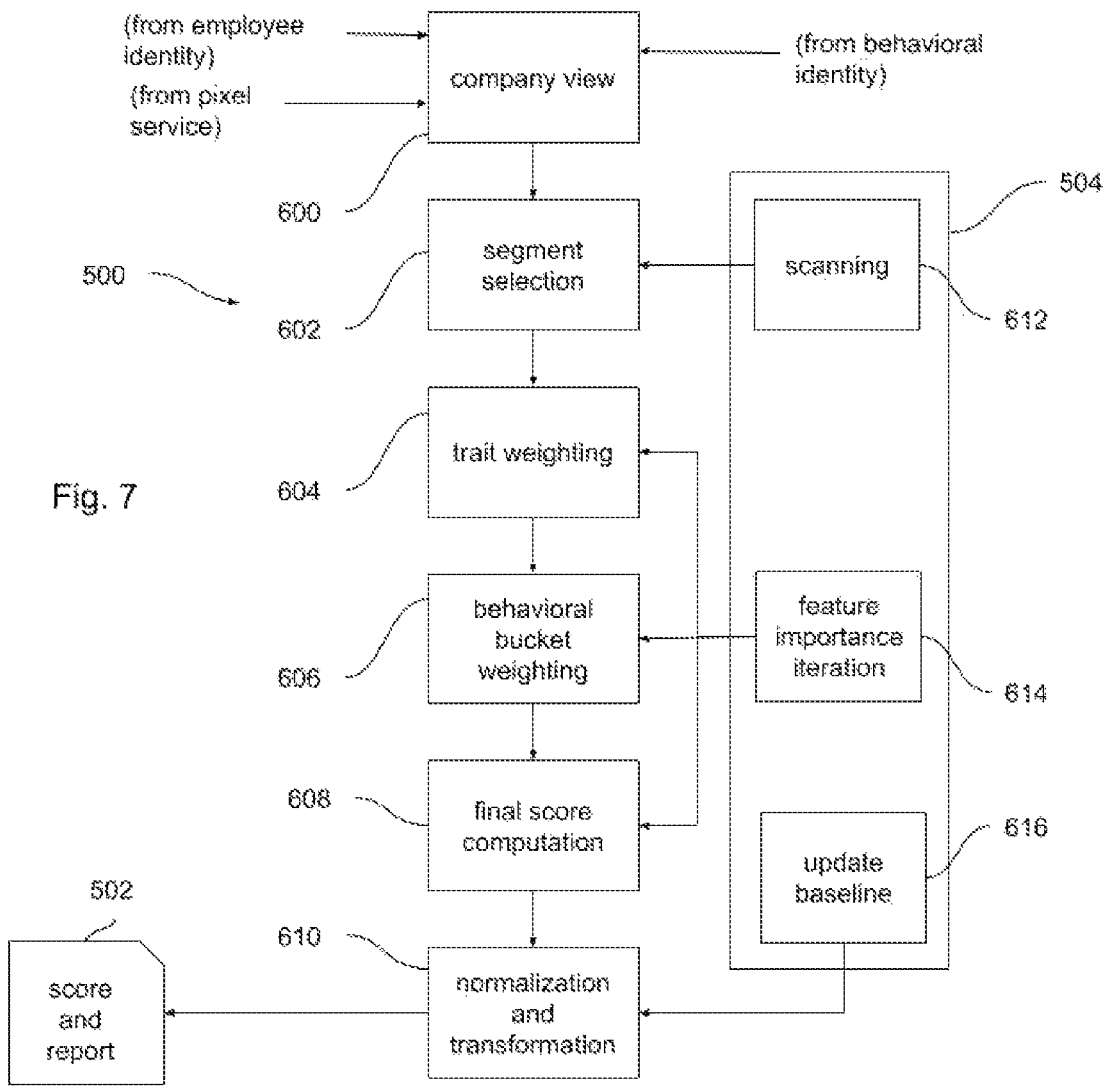
FIG. 7 is a high-level flow diagram for the scoring platform according to an implementation of the present invention.
Figure 8:
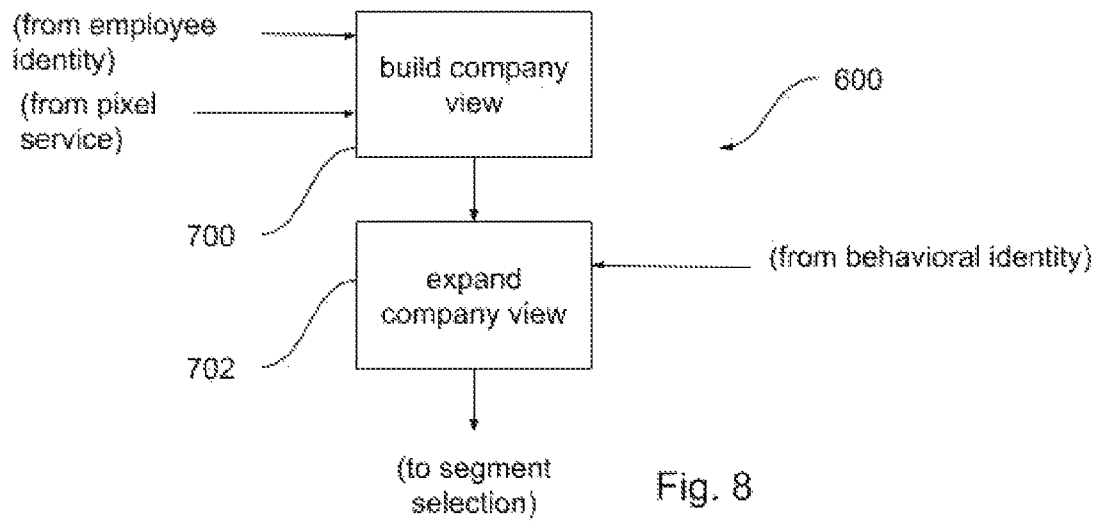
FIG. 8 is a flow diagram for the company view component of the scoring platform according to an implementation of the present invention.

Referring now to FIG. 6, the components of scoring platform 14 may be described. Risk scoring compute cluster 500 receives input from pixel service compute cluster 400, employee identity compute cluster 402, and behavioral identity compute cluster 404. This information includes the employee information that has been gathered, filtered, matched, and consolidated through the previous parts of the process. The risk scoring system cluster 500 then uses this data to create a cyber security score for the organization and an accompanying report.

To generate the employee-business identity graphs, the system draws connections between the company/organization name and its associated IP address. Then, the system determines which individual identities or "employees" are significantly associated with that IP address. The resulting graph is able to intake PII, online identifiers, and/or offline identifiers and translate them into a pseudonymous identifier which is then linked to an IP address. If the IP address belongs to a business entity and the user is significantly correlated with the business IP, then the individual is classified as an employee. Next, these connections are consolidated to form a single view of the organization and anonymous individuals, and their associated behavioral segments are identified. Relevant segments from the behavioral data are then selected to constitute the score by either string matching the segment name against a database of selected segments determined to be associated with cyber risk or by performing Natural Language Process (NLP) modeling on the names themselves Organizations with fewer than five anonymous identifiers tied to them are sanitized from the database and are not further processed for privacy purposes. Segment ratios, used to determine the ultimate cyber risk score, are calculated by determining the number of anonymous identifiers at the organization in that particular segment divided by the total number of anonymous identifiers tied to that organization. Segment grouping is then performed by applying negative and positive multiplicative weights to all ratios depending on the segment's alignment with secure or insecure cyber practices. These segments, and their corresponding ratios, are then grouped into the following cyber risk traits via string matching to a key-value database of segments and trait pairs or via clustering (i.e., Principal Component Analysis): financial risk-taking, social risk-taking, recreational risk-taking, conscientiousness, neuroticism, openness, agreeableness, extraversion, and decision-making. Trait scores are then computed by performing a weighted sum on the relevant segment ratios. For this score computation, these weights are determined by performing feature importance and are continually improved via feedback loop. The traits, and their corresponding trait scores, are then categorized into the following behavioral buckets via string matching to a key-value database trait and behavior pairs or via clustering: decisioning-making, personality, and risk propensity. An overall behavior score is computed by performing a weighted sum over the trait scores For the score computation just described, the weights are determined by feature importance and continually improved via feedback loop 504. These trait scores are then pushed through another weighted sum, weights determined by performing feature importance and continually improved via feedback loop 504, to compute an overall risk score at risk scoring compute cluster 500. These scores are then normalized against a baseline group of companies that are regularly sampled to compute z-scores. The z-scores are scaled to a thousand point model to constitute the final cybersecurity score and report 502.

With reference to FIGS. 7-13, a flow for the processing at risk scoring compute cluster 500 may now be described in greater detail. The first step of the processing occurs at company view process 600, the sub-steps of which are shown in more detail at FIG. 8. The build company view sub-step 700 takes the information from the employee portal and pixel services, as previously described, to create a single view of the organization and the anonymous individuals who are associated with (e.g., the employees of) the organization. At expand company view sub-step 702, behavioral data is appended to the anonymous individuals through identity resolution, which will provide the scoring mechanism with the full view of the organization's employee behavior needed to construct the cyber risk score and report 502.

Figure 9:
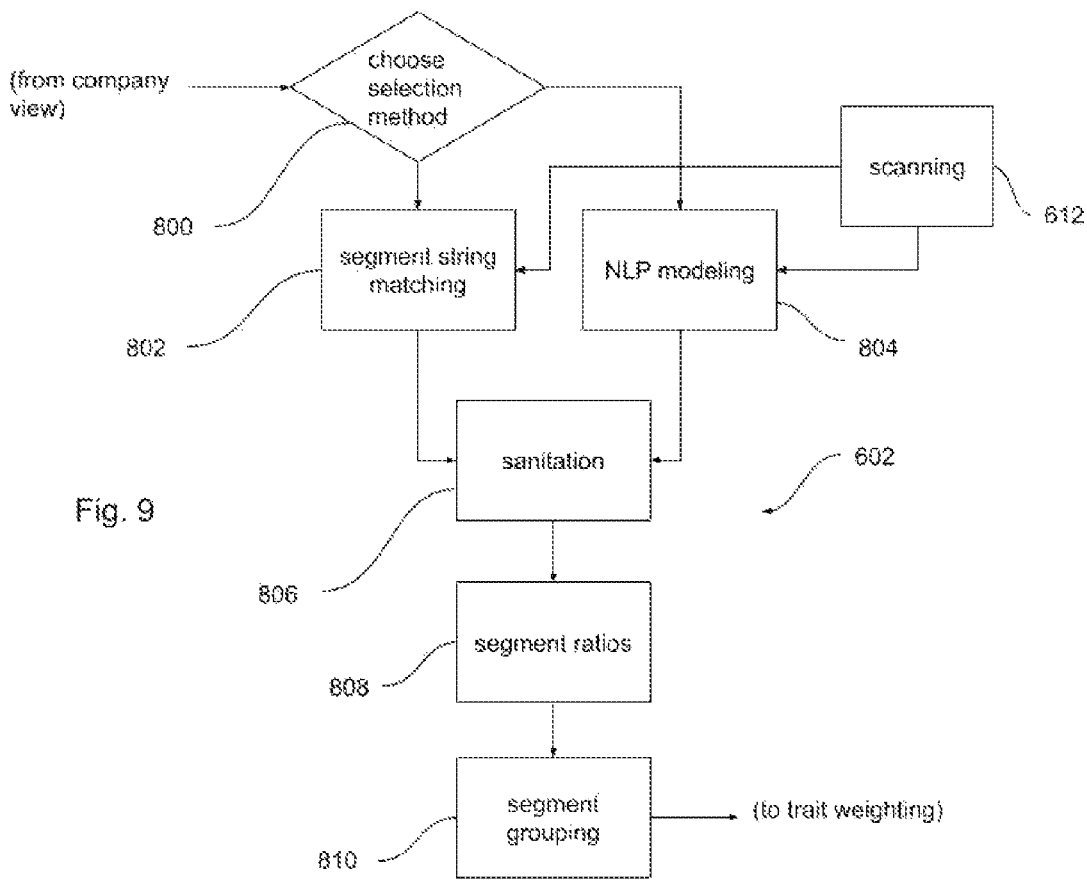
FIG. 9 is a flow diagram for the segment selection component of the scoring platform according to an implementation of the present invention.

Next, segment selection occurs at segment selection process 602, the sub-steps of which are shown in more detail at FIG. 9. In various implementations of the invention, either of two different segment selection methods may be used, or the system may implement both and provide a choice 800 at the time of segment selection. Segment string matching 802 determines which segments to assess by performing string matching against a set list of segments associated with cyber risk. Alternatively, NPL modeling 804 determines which segments to assess through a natural language processing (NLP) model of words associated with segment risk. In either case, scanning sub-step 612 from the feedback 504 is used in order to input other "truth sets" such as, for example, email compromise data sets. These are input through scanning and/or application programming interface (API) calls. After the segments for assessment are selected, processing moves to the sanitation sub-step 806, which is used to remove those organizations that do not have sufficient information in order to be categorized. At segment ratios sub-step 808, the ratio is calculated of the number of anonymous identifiers with each segment versus the number of anonymous identifiers across the organization. Finally at segment grouping sub-step 810, grouping is performed on the segments by applying negative and positive multiplicative weights to all segments depending on their alignment with secure and insecure practices.

Figure 10:
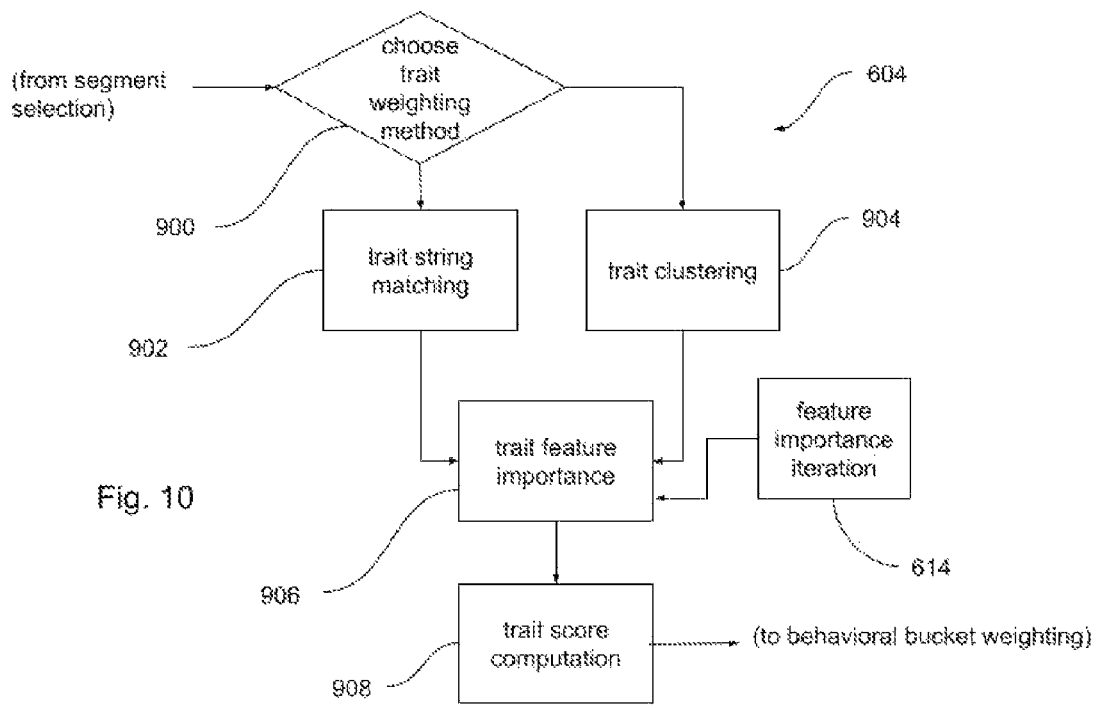
FIG. 10 is a flow diagram for the trait weighting component of the scoring platform according to an implementation of the present invention.

Next, trait weighting occurs at trait weighting process 604, the sub-steps of which are shown in more detail at FIG. 10. In various implementations of the invention, either of two different trait creation methods may be used, or the system may implement both and provide a choice 900 at the time of trait creation. At trait string matching 902, the system determines which segments go in which trait groups by string matching against a database of key value pairs. Alternatively, at trait clustering 904, principal components analysis (PCA) is used to perform clustering in order to group segments into broader trait categories or groups. In either case, the trait groups in one implementation of the invention are as follows: financial risk-taking; social risk-taking; recreational risk-taking; conscientiousness; neuroticism; openness; agreeableness; extraversion; and decision making. Processing then moves to trait feature importance sub-step 906, where the system determines the weights of segments for cyber risk calculations via feature importance. Using feature importance iteration 614, the process at this sub-step is continually improved by means of the feedback loop. Feature importance iteration 614 iterates on weighting and feature importance through a feedback loop of risk incidents of scored organizations. Finally, at trait score computation sub-step 908, the trait scores are computed through a weighted sum of segment ratios and the corresponding importance weights.

Figure 11:
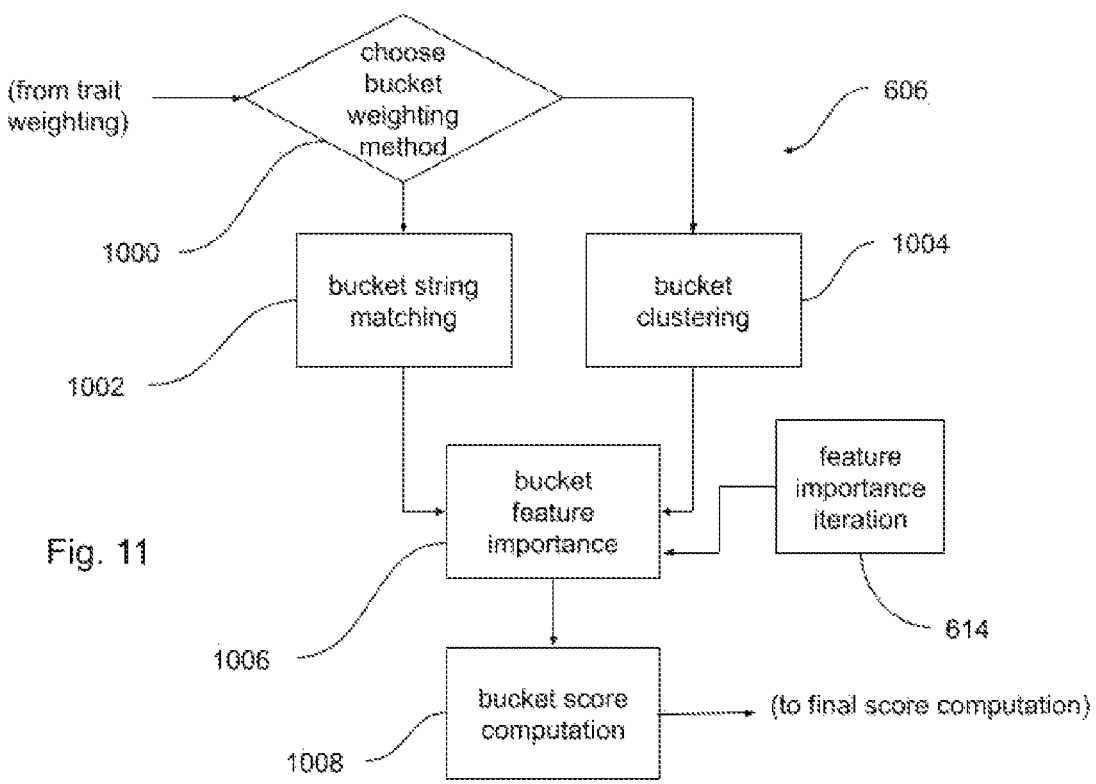
FIG. 11 is a flow diagram for the behavioral bucket weighting component of the scoring platform according to an implementation of the present invention.

Next, behavioral bucket weighting occurs at behavioral bucket weighting process 606, the sub-steps of which are shown in more detail at FIG. 11. In various implementations of the invention, either of two bucket weighting methods may be used, or the system may implement both and provide a choice at 1000 at the time of bucket weighting. At bucket string matching 1002, the system determines which traits are in which behavioral groups by string matching against a database of key value pairs. Alternatively, at bucket clustering 1004, the system performs clustering via PCA in order to group traits into broader behavioral categories. In either case, in one implementation of the invention the behavioral buckets are as follows: risk propensity; decision making; and personality. The process then moves to bucket feature importance sub-step 1006, at which the system determines weights of the traits for score computation via feature importance. Using feature importance iteration 614, the process at this sub-step is continually improved by means of the feedback loop. Finally, the process moves to bucket score computation sub-step 1008, at which the system computes behavioral scores through weighted sums of trait scores and the corresponding importance weights.

Figure 12:
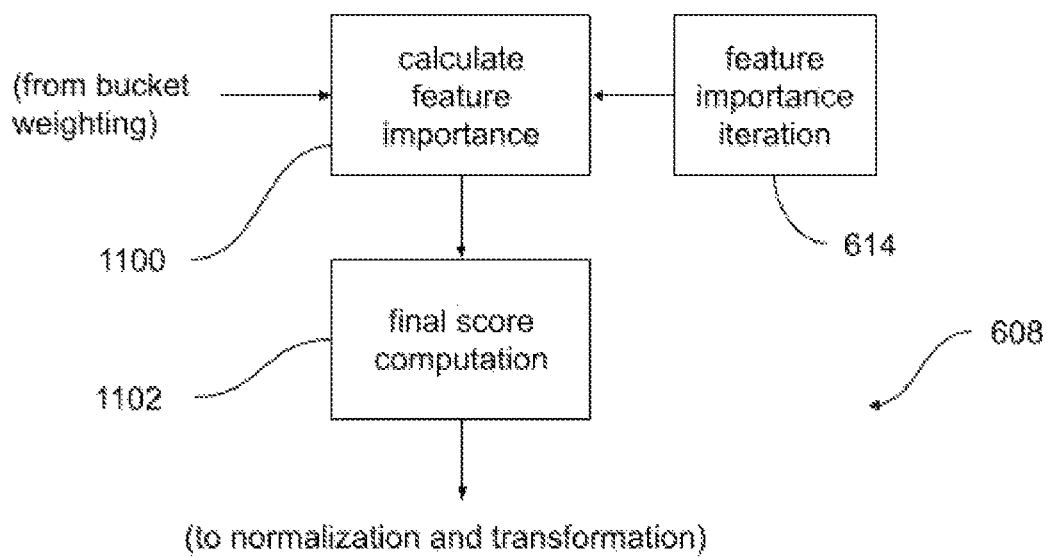
FIG. 12 is a flow diagram for the final score computation component of the scoring platform according to an implementation of the present invention.

Next, final score computation occurs at final score computation process 608, the sub-steps of which are shown in more detail at FIG. 12. At calculate feature importance sub-step 1100, the system determines weights of behavioral categories for score computation via feature importance. Using feature importance iteration 614, the process at this sub-step is continually improved by means of the feedback loop. Processing then moves to final score computation sub-step 1102, at which the system computes final cyber risk scores through a weighted sum of behavioral scores and the corresponding importance weights.

Figure 13:
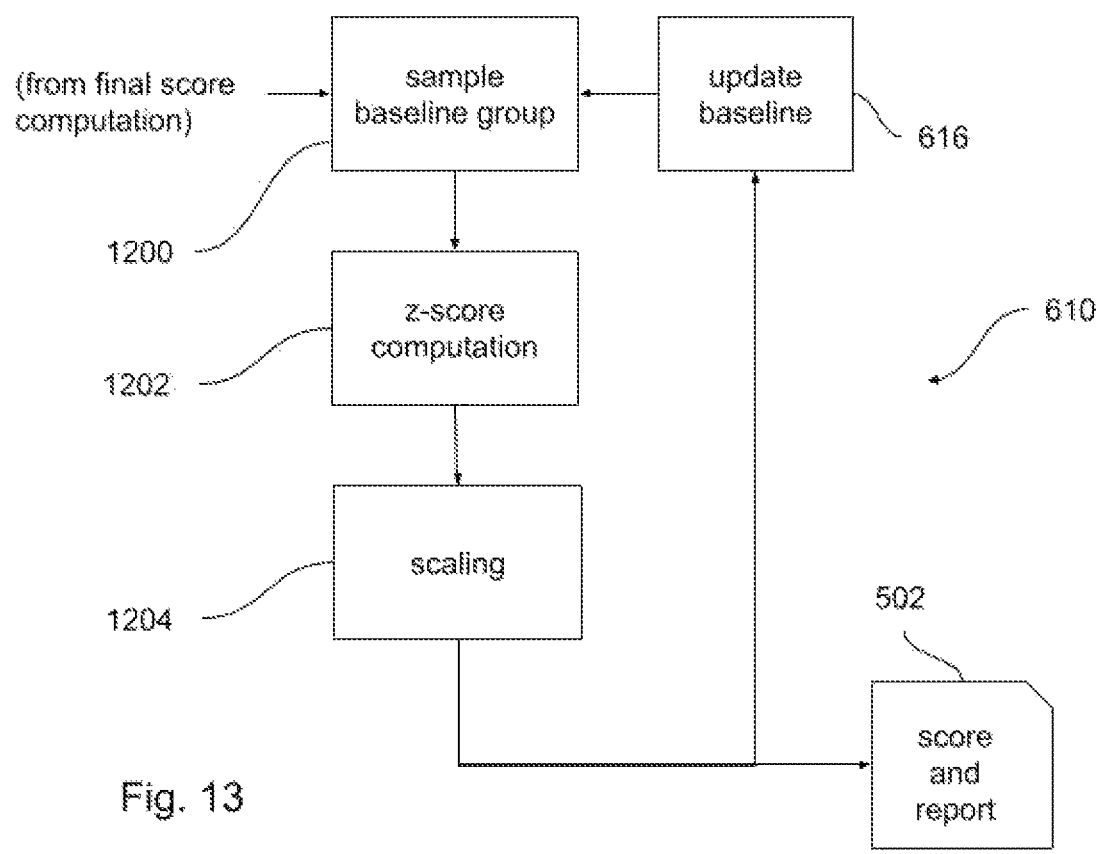
FIG. 13 is a flow diagram for the scoring normalization and transformation component of the scoring platform according to an implementation of the present invention.

Next, normalization and transformation occurs at normalization and transformation process 610, the sub-steps of which are shown in more detail at FIG. 13. At sample baseline group 1200, the system regularly samples organizations across size and industry to determine baseline risk levels for each trait and behavioral bucket to scale against. This sub-step uses input from update baseline 616, part of feedback 504, which updates based on, for example, employee turnover, contractor makeup, and behavioral changes. Based on the feedback received from participating organizations using the system, the baseline will adapt and change over time. Next, at z-score computation sub-step 1202, the system calculates z-scores against the baseline group. In statistics, the "z-score" or standard score is the number of standard deviations by which the value of a raw score is above or below the mean value of what is being measured. Raw scores above the mean have positive z-scores, while those below the mean have negative z-scores. After calculating the z-scores, the system at this sub-step sets intervals based on the distribution of the z-scores, forcing outliers beyond the z-score interval to either the minimum or maximum values. Finally, at scaling sub-step 1204, the system scales the z-scores to a particular model, in one implementation using a thousand-point model. The output of this sub-step is then the score and report 502 as previously described. The scaling sub-step 1204 also sends its data back up to feedback 504, specifically update baseline sub-step 616, in order to generate the necessary feedback loop for constantly improving the baseline.

Referring now again to FIG. 6, the cyber security score and report 502 that are generated at risk scoring compute cluster 500 are sent back to partner platform 12, which is operated and maintained by the organization desiring the score and report 502. The organization may then use partner platform 12 to provide feedback, additional attributes, real-world events pertaining to the cyber security risk score and report, qualitative inputs, and other data related to particular employees or the organization as a whole (collectively herein, feedback 504). This feedback 504 data is then fed into the cyber security risk scoring compute cluster 500 from partner platform 12 in a feedback loop to update the cyber security score and report 502 using this additional information. In certain implementations, any or all of these processes may occur in real time. By using real-time operations, the cyber security score and report 502 may be constantly updated in order to provide the most recent and most accurate data. Real-time may mean, for example, that as data is received from partner platform 12, the score and report 502 is constantly being re-created and updated and re-sent back to partner platform 12 even as new data is received at scoring platform 14. In this way, for example, a browsing activity by an employee that would be indicative of risk may very quickly result in an adjustment to score and report 502, potentially even as the employee is still engaged in the browsing activity that created the risk which led to the change in score and report 502.

The systems and methods described herein may in various embodiments be implemented by any combination of hardware and software. For example, in one embodiment, the systems and methods may be implemented by a set of computer systems, each of which includes one or more processors executing program instructions stored on a computer-readable storage medium coupled to the processors. The program instructions may implement the functionality described herein. The various systems and displays as illustrated in the Figure and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Python, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub combinations possible of the group are intended to be individually included in the disclosure. All references cited herein are hereby incorporated by reference to the extent that there is no inconsistency with the disclosure of this specification. When a range is used herein, all points within the range and all subranges within the range are intended to be included in the disclosure.

The present invention has been described with reference to certain preferred and alternative implementations that are intended to be exemplary only and not limiting to the full scope of the present invention.

The invention claimed is:

1. A cyber security system, comprising:
   An identity compute cluster, wherein the identity compute cluster is configured to perform identity resolution for a plurality of objects, strip all personally identifiable information (PII) from the data pertaining to risk behaviors for the objects, associate an anonymized link associated with each of the objects for which there is data pertaining to risk behaviors, wherein the anonymized link does not contain any PII, and to output anonymized data pertaining to risk behaviors for the objects and append the anonymized link to corresponding data pertaining to risk behavior for each such object;
   a pixel service compute cluster, wherein the pixel service compute cluster is configured to receive online activity data from a plurality of sources, associate the online activity data with particular devices, and output the online activity data associated with particular devices to the identity compute cluster;
   a behavioral identity compute cluster, wherein the behavioral identity compute cluster is configured to receive behavioral data and associate the behavioral data with particular entities, and output behavioral data associated with particular entities to the identity compute cluster; and
   a risk scoring compute cluster, wherein the risk scoring compute cluster is configured to receive the anonymized data pertaining to risk behaviors for the objects from the identity compute cluster; calculate trait scores for a plurality of cyber risk traits, wherein the cyber risk traits comprise at least financial risk-taking, social risk-taking, recreational risk-taking, conscientiousness, and decision making; group the trait scores into behavioral buckets, wherein the behavioral buckets include at least risk propensity, decision making, and personality; calculate behavioral bucket scores by performing a weighted sum of the trait scores within each behavioral bucket; compute a cyber security score based on a weighted sum of the behavioral bucket scores; and generate a report.

2. The cyber security system of claim 1, wherein the risk scoring compute cluster is further configured to receive feedback from a business computing system and re-calculate the cyber security score and report utilizing the feedback.

3. The cyber security system of claim 2, wherein the risk scoring compute cluster is further configured to re-calculate the cyber security score and report in real time.

4. The cyber security system of claim 1, further comprising a business-to-business (B2B) identity graph, wherein the identity compute cluster is configured to perform identity resolution for the plurality of objects by comparing data received at the identity compute cluster against the B2B identity graph.

5. The cyber security system of claim 4, wherein the B2B identity graph comprises a plurality of nodes wherein each node corresponds to a business entity, and a node exists for all business entities of a segment within a particular region.

6. The cyber security system of claim 1, further comprising a behavioral data platform configured to provide behavioral data to the behavioral identity compute cluster.

7. The cyber security system of claim 6, wherein the behavioral identity compute cluster is further configured to collect device behavioral activity associated with an object.

8. The cyber security system of claim 7, wherein the behavioral identity compute cluster is further configured to collect one or both of firmographic and behavioral data.

9. The cyber security system of claim 1, further comprising a partner platform, wherein the partner platform comprises a set of records each pertaining to a particular object associated with an entity and each record comprises PII associated with the particular object.

10. The cyber security system of claim 9, wherein the partner platform is configured to provide Internet protocol (IP) address data to the pixel service compute cluster.

11. The cyber security system of claim 10, wherein the partner platform comprises a plurality of employee electronic devices, wherein the employee electronic devices comprise a web browser configured to send browsing data to the pixel service compute cluster.

12. A method for assessing cyber security of a partner 15. platform, comprising:
   at the partner platform, creating a set of records each pertaining to a particular object associated with an entity wherein each record comprises PII associated with the particular object;
   at an identity compute cluster, performing identity resolution for a plurality of objects, and outputting anonymized data pertaining to risk behaviors for the objects;
   at a pixel service compute cluster, receiving a set of Internet protocol (IP) address data from the partner platform, matching online activity data from a plurality of sources with particular electronic devices, and outputting the online activity data associated with the particular electronic devices to the identity compute cluster;
   at a behavioral identity compute cluster, matching the behavioral data to particular entities, and outputting behavioral data associated with particular entities to the identity compute cluster; and at a risk scoring compute cluster, matching against the behavioral data using a list of segments associated with cyber risk, clustering the segments into trait categories and performing a weighted sum of the trait categories to compute a cyber security score from the behavioral data associated with particular entities, wherein the segments comprise at least financial risk-taking, social risk-taking, recreational risk-taking, conscientiousness, and decision making, and wherein the trait categories comprise at least risk propensity, decision making, and personality.

13. The method of claim 12, further comprising the steps of generating feedback at the partner platform and re-calculating the cyber security score utilizing the feedback.

14. The method of claim 13, wherein the step of re-calculating the cyber security score is performed in real time.

15. The method of claim 12, further comprising the steps of stripping all personally identifiable data (PII) from the data pertaining to risk behaviors for the objects, associating an anonymized link associated with each of the objects for which there is data pertaining to risk behaviors, and appending the anonymized link to corresponding data pertaining to risk behavior for each such object.

16. The method of claim 12, further comprising the step of performing firm identity resolution for the plurality of objects by comparing data received at the identity compute cluster against a business-to-business (B2B) identity graph.

17. The method of claim 12, further comprising the step of sending browsing data from a web browser to the pixel service compute cluster.

18. The method of claim 12, wherein the step of matching at the risk scoring compute cluster comprises string matching to identify segments associated with cyber risk.

19. The method of claim 12, wherein the step of matching at the risk scoring compute cluster comprises natural language processing (NLP) to identify segments associated with cyber risk and performing clustering of the segments into the trait categories using principal components analysis (PCA).

20. A system for managing cyber risk, comprising:
an identity compute cluster, wherein the identity compute cluster is configured to perform identity resolution for a plurality of objects, strip all personally identifiable data pertaining to risk behaviors for the objects, associate an anonymized link with each of the objects for which there is data pertaining to risk behaviors, append the anonymized link to corresponding data pertaining to risk behavior for each such object, and output anonymized data pertaining to risk behaviors for the objects;
a pixel service compute cluster, wherein the pixel service computer cluster is configured to receive online activity data, associate the online activity data with particular devices, and output the online activity data associated with particular devices to the identity compute cluster;
a behavioral identity compute cluster, wherein the behavioral identity compute cluster is configured to receive behavioral data and associate the behavioral data with particular entities, and output behavioral data associated with particular entities to the identity compute cluster;
a behavioral data platform configured to collect device behavioral activity associated with an object and to provide behavioral data to the behavioral identity compute cluster;
a business-to-business (B2B) identity graph comprising a plurality of nodes each corresponding to a business entity, wherein the identity compute cluster is configured to perform identity resolution for the plurality of objects by comparing data received at the identity compute cluster against the B2B identity graph;
a partner platform comprising a plurality of employee electronic devices, each comprising a web browser and wherein the partner platform is configured to provide a plurality of Internet protocol (IP) address data from the web browser to the pixel service compute cluster; and
a risk scoring compute cluster, wherein the risk scoring compute cluster is configured to receive the anonymized data pertaining to risk behaviors for the objects from the identity compute cluster, compute a cyber security score and report, receive feedback from a business computing system and re-calculate the cyber security score and report utilizing the feedback in real time, wherein the cyber security score is calculated by first calculating trait scores for a plurality of cyber risk traits, wherein the cyber risk traits comprise at least financial risk-taking, social risk-taking, recreational risk-taking, conscientiousness, and decision making, grouping the trait scores into behavioral buckets, wherein the behavioral buckets include at least risk propensity, decision making, and personality, calculating behavioral bucket scores by performing a weighted sum of the trait scores within each behavioral bucket, and then calculating a weighted sum of the behavioral bucket scores.

* * * * *